United States Patent [19]
Fletcher et al.

[11] 3,759,443
[45] Sept. 18, 1973

[54] THERMAL FLUX TRANSFER SYSTEM

[76] Inventors: James C. Fletcher, Administrator of the National Aeronautics and Space Administration, with respect to an invention of; Robert Alfred Freggens, Lancaster, Pa.

[22] Filed: June 16, 1971

[21] Appl. No.: 153,542

[52] U.S. Cl. ............... 239/127.1, 60/267, 165/105, 165/141, 165/185
[51] Int. Cl. .......................................... F02k 11/02
[58] Field of Search ........................ 165/105, 32, 96, 165/135, 185, 141; 60/267; 239/127.1

[56] References Cited
UNITED STATES PATENTS

| | | | |
|---|---|---|---|
| 3,493,177 | 2/1970 | Bromberg et al. | 165/105 X |
| 3,603,382 | 9/1971 | Paine | 165/105 |
| 3,662,542 | 5/1972 | Streb | 165/105 X |
| 3,357,413 | 12/1967 | Quinton | 123/41.08 X |

FOREIGN PATENTS OR APPLICATIONS

881,450   6/1953   Germany .......................... 165/32

*Primary Examiner*—Albert W. Davis, Jr.
*Attorney*—John R. Manning et al.

[57] ABSTRACT

A thermal flux transfer system for use in maintaining the thrust chamber of an operative reaction motor at given temperatures. The system is characterized by an hermetically sealed chamber surrounding a thrust chamber to be cooled, having seated therewithin a plurality of parallel, longitudinally spaced, disk-shaped wick members formed of a metallic mesh and employed in delivering a working fluid, in its liquid state, radially toward the thrust chamber and subsequently delivering the working fluid, in its vapor state, away from the nozzle for thereby effecting a cooling of the nozzle, in accordance with known principles of an operating heat pipe.

7 Claims, 7 Drawing Figures

PATENTED SEP 18 1973
3,759,443
SHEET 1 OF 2
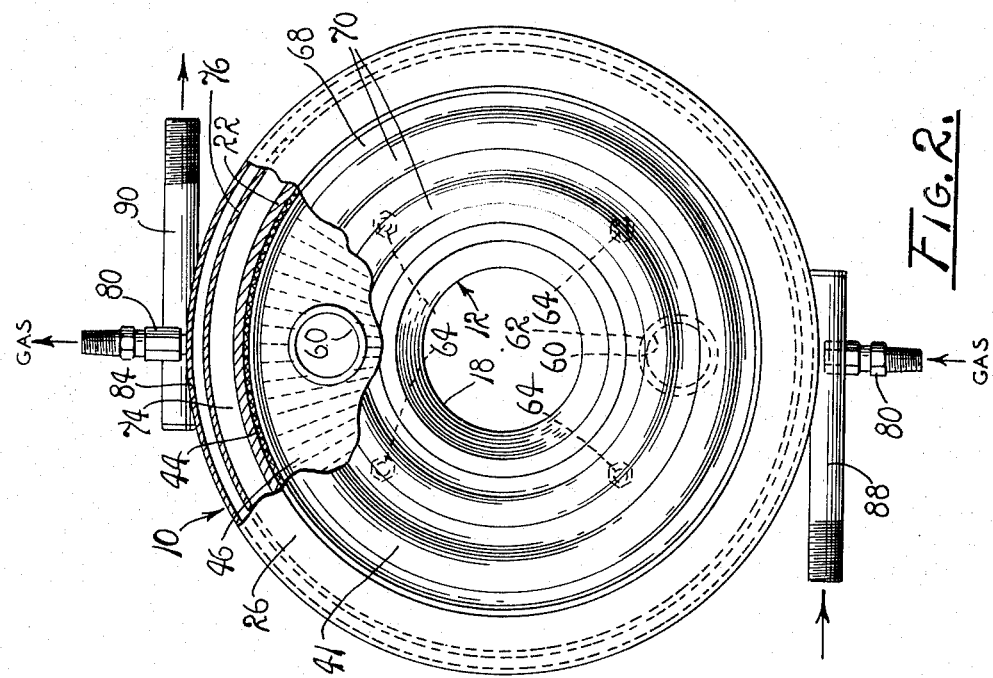
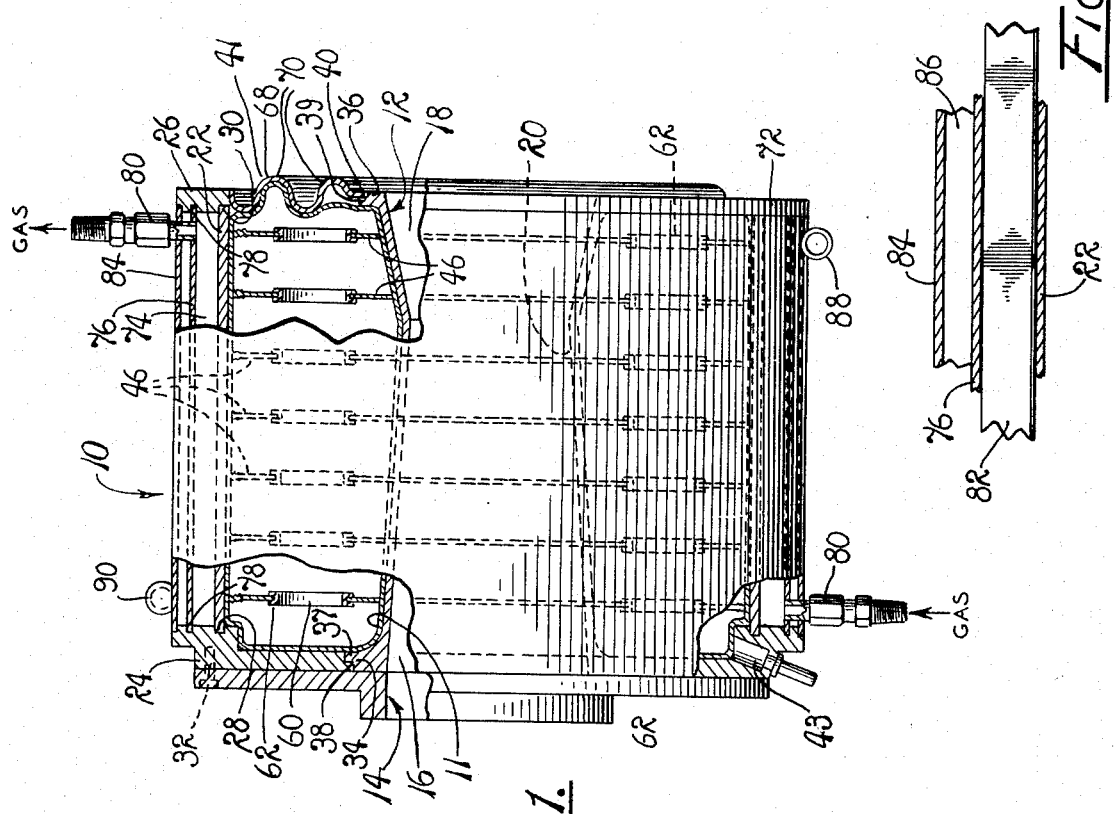
ROBERT A. FREGGENS
INVENTOR
ATTORNEYS

ROBERT A. FREGGENS
INVENTOR

Monte F. Mott
Wilfred Grifka
ATTORNEYS 3,759,443

THERMAL FLUX TRANSFER SYSTEM

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention relates to a thermal flux transfer system for maintaining a thrust chamber of a reaction motor at a given temperature, and more particularly to a thermal flux transfer system for use in cooling reaction motors such as those frequently referred to as jet engines, rocket motors and the like.

2. Description of the Prior Art

Various attempts have been made to reduce the deleterious effects of the severe temperatures commonly encountered in the regions of the thrust chambers of operative reaction motors. These attempts include providing thermal flux transfer systems, of various types, associated with the thrust chambers of such motors. Of course, in an operative environment, an optimum thermal flux transfer system should achieve maximum cooling while employing minimal mass. However, numerous difficulties frequently are experienced in providing reaction motors of spacecraft and the like with optimum flux transfer systems. As a result of the experienced difficulties, cooling systems employing the principles of the so-called "heat-pipe" have been proposed for maintaining critically heated regions of rocket motors at or below optimum temperatures.

Such a system is described and claimed in the applicant's copending application, Ser. No. 773,827, filed Nov. 6, 1968.

OBJECTS AND SUMMARY OF THE INVENTION

It is an object of the instant invention to provide an improved therman flux transfer system for a heated body.

It is another object to provide a thermal flux transfer system for a heated body employed in any gravity plane.

Another object is to provide an improved thermal flux transfer system employing the principles of a heat-pipe for cooling reaction motors.

Another object is to provide an improved thermal flux transfer system for cooling critically heated regions of reaction motor in propulsion systems of the type frequently employed aboard spacecraft.

Another object is to provide a thermal flux transfer system for cooling thrust chambers of reaction motors of a type having a combustion chamber communicating with an exhaust section through a throat of a converging-diverging configuration.

Another object is to provide a system of a type employing the principles of a heat-pipe for cooling the thrust chamber of a reaction motor a plurality of radial return paths for reducing the flow path across the surface of a thrust chamber, whereby large quantities of working fluid are provided for thereby enhancing cooling of the thrust chamber.

These and other objects and advantages of the instant invention are achieved through the use of a shell defining about a thrust chamber an hermetically sealed chamber including therein a plurality of mutually spaced, disk-shaped evaporator wicks radially extending from the external surface of the thrust chamber to an internal surface of the shell, whereby heat is transferred from the thrust chamber to a working fluid, as it is evaporated in the vicinity of the external surface of the thrust chamber, and subsequently delivered from the resulting vapor as it is condensed in the vicinity of the shell, all in a manner consistent with that of cooling systems which employ the operative principles of the so-called heat-pipe.

BRIEF DESCRIPTION OF THE DRAWINGS

FIG. 1 is a partially sectioned side elevation of a thermal flux transfer system which embodies the principles of the instant invention.

FIG. 2 is a partially sectioned end elevation of the system shown in FIG. 1.

FIG. 7 is a fragmented and partially sectioned view illustrating a modified form of the condenser employed by the thermal flux transfer system shown in FIGS. 1 through 6.

DESCRIPTION OF THE PREFERRED EMBODIMENT

Figure 3:
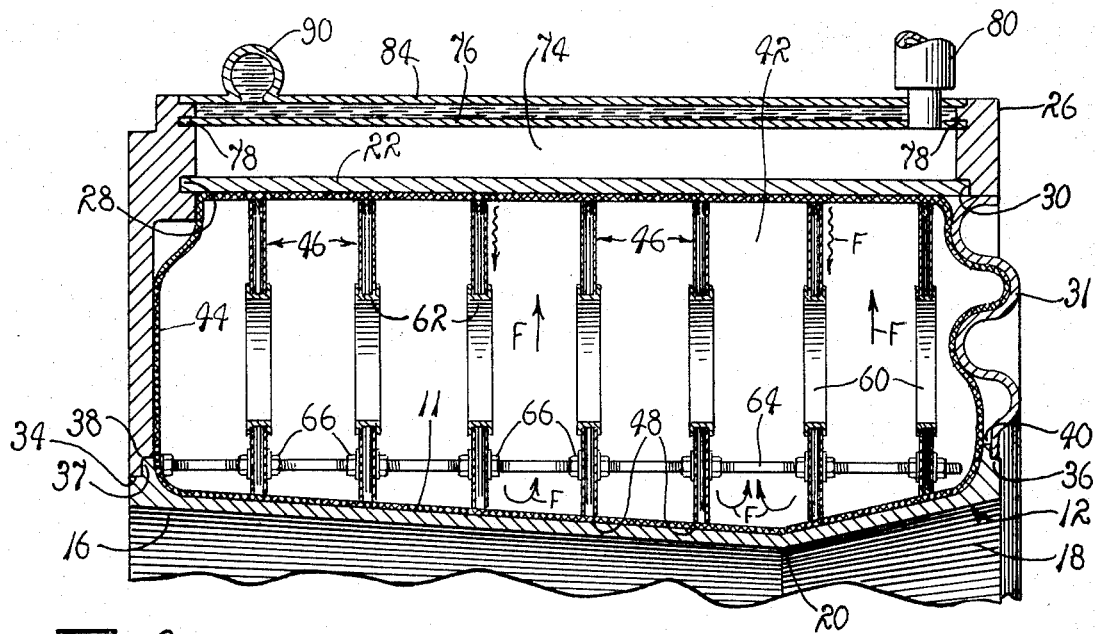
FIG. 3 is a fragmented sectional view, on an enlarged scale, of the thermal flux transfer system illustrated in FIG. 1.

Referring now to the drawings wherein like reference characters designate like or corresponding parts throughout the several views, there is shown in FIG. 1 a thermal flux transfer system, generally designated 10, which embodies the principles of the instant invention.

As shown, the system 10 circumscribes the external surface 11 of a thrust chamber 12 of a selected reaction motor, not shown. The thrust chamber 12 operatively is associated with the reaction motor in a manner such that there is provided a combustion chamber, also not shown, coupled at the upstream end of the thrust chamber 12 through a suitable coupling plate 14. Since particular reaction motors with which the system 10 is employed form no specific part of the instant invention, a detailed description of the aforementioned motors and their combustion chambers is omitted in the interest of brevity.

It is, however, to be understood that the thrust chamber 12 includes a converging section 16 within which heated gases are compressed and from which the gases are delivered to a diverging exhaust section 18 through a constricted throat section 20. As should readily be apparent, the throat section 20, in practice, is provided with a diameter substantially less than the diameter of the exhaust section 18, as well as the converging section 16. Consequently, the throat section 20 particularly is subjected to critical heating during periods of the motor's operation due to the flow of heated and compressed gases operatively established therethrough.

It is quite important to understand that while the thermal flux transfer system 10 preferably is employed in cooling a thrust chamber for a reaction motor, the system can be employed equally as well in cooling heated bodies of a general nature which, in operation, require continuous, efficient cooling.

In practice, the system 10 includes a first shell 22 of a tubular configuration, closed at one end by a leading end plate 24 and closed at the other end by a trailing end plate 26, with these plates being securely coupled with the shell. In order to facilitate coupling of the shell 22 and the end plate 24, the end plate is provided with an annular groove 28 of a dimension sufficient to accommodate an axial insertion of the leading end of the shell 22. Once the shell 22 is inserted, coupling is completed employing suitable fabrication techniques, including welding and the like. Similarly, the trailing end plate 26 is provided with an annular groove 30 properly dimensioned for accommodating an axial insertion of the trailing end of the shell 22. The shell 22 also is welded or similarly secured to the end plate 26. It is to be understood that regardless of the manner in which the coupling of the shell and plates is effected, an hermetic seal is established along the lines of the coupling.

Of course, when the associated reaction motor is operated, the external surface 11 of the thrust chamber 12 is heated to temperatures substantially greater than the temperature of the shell 22. Therefore, an uneven heating of the system's components is experienced. In order to afford relief for stress developed as uneven temperature changes are experienced within the system, the trailing end plate 26 includes a corrugated center section 31 circumscribed by a rigid annular base, not designated, secured to the section 31 in any suitable manner, including welding and the like.

In any event, it is to be understood that the corrugations of the section 31 are concentrically related and, in operation, are deformed for thus accommodating thermally induced, uneven expansion for the various components of the system 10 as the associated reaction motor delivers thereto heat generated thereby.

In practice, the leading end plate 24 includes a plurality of screw-threaded bores 32 within which is received a plurality of studs, not shown, employed in uniting the coupling plate 14 with the system 10.

Within the end plates 24 and 26 there is provided a pair of circular, coaxially aligned openings, designated 34 and 36, respectively, for concentrically receiving opposite end portions of the thrust chamber 12. Preferably, the external surface 11 of the thrust chamber 12 is provided with an annular rib 37 having defined thereon an annular shoulder 38 concentrically received within the opening 34, in sealing engagement with the adjacent annular surface of the leading end plate 24. Within the opening 36 the trailing end plate 26 similarly receives an annular rib 39 circumscribing the trailing end, of the thrust chamber 12. The rib 39 has defined thereon a radial shoulder 40 which engages the adjacent surface of the end plate 26. Accordingly, it should readily be apparent that the leading and trailing end plates 24 and 26, respectively, and the cylindrical shell 22 collectively define an hermetically sealed working chamber 42 confining therewithin the external surface 11 of the thrust chamber 12.

Within the working chamber 42 there is deposited a working fluid, designated F in FIG. 3. The working fluid F is introduced into the chamber 42 through a sealable port 43, and is selected from fluids which are compatible with the materials employed in fabricating the system 10. Preferably, the fluid F has a vapor phase at a temperature below the operative temperature of the external surface 11 of the thrust chamber 12 and a liquid phase at a temperature above the temperature at which the shell 22 operatively is maintained. Typical working fluids include sodium, potassium and lithium.

Hence, internal regenerative cooling is achievable by transferring heat from the surface of the thrust chamber 12 to the working fluid F employing the latent heat of evaporation of the working fluid F. Therefore, the working fluid F delivered to the external surface 11 of the thrust chamber 12 is there vaporized. Heat thus acquired by the working fluid F then is transported and given up in the vicinity of the internal surface of the shell 22, not designated, as the vaporized coolant is permitted to cool and subsequently condense in the region of the chamber adjacent to the internal surface of the shell 22.

The working chamber 42 is fully lined with a wick 44, fabricated from any suitable material, including multi-layer screens, and the like, which provide multiple openings employed for establishing capillary forces of a magnitude sufficient to effect a so-called pumping of the working fluid F. As a practical matter, four layers of fifty mesh nickel screen supported in place by a 0.06 inch cylindrical stainless steel spring, not shown, functions quite satisfactorily for this purpose. For the sake of simplicity, however, a single layer of screen is illustrated.

Within the space delineated by the wick 44, there is seated a plurality of coaxially related and mutually spaced disk-shaped wick members 46. These wicks provide a plurality of return paths for returning the working fluid F, in its liquid phase, to the vicinity of the surface 11. As a practical matter, each of the wick members 46 is provided with an axial opening 48 of a diameter consistent with that of the portion of the surface 11 of the thrust chamber 12 upon which the wick 44 is seated. In practice, the wick members 46 are radially oriented for accommodating operation of the system 10 in any gravity plane.

Figure 4:
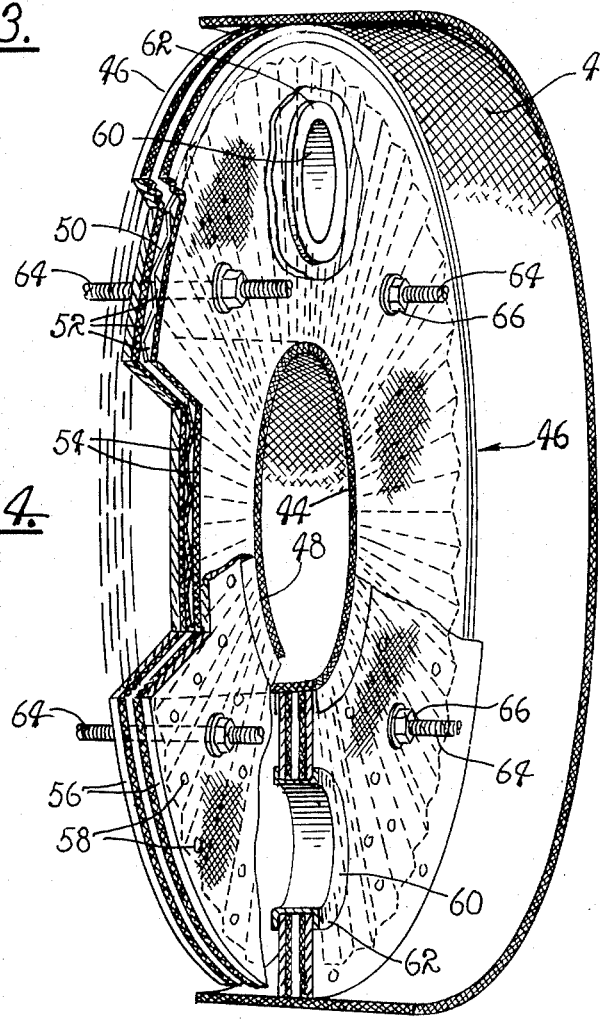
FIG. 4 is a partially sectioned, perspective view of a single one of a plurality of wicks shown in FIG. 1.
Figure 5:
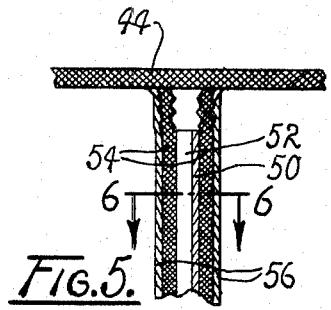
FIG. 5 is a fragmented and sectioned view illustrating one manner in which the wick of FIG. 4 is assembled.
Figure 6:
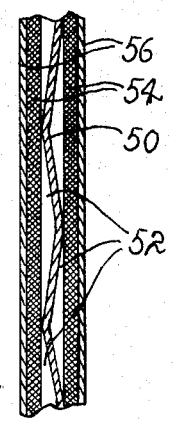
FIG. 6 is a sectioned view taken generally along line 6—6 of FIG. 5.

As illustrated in FIGS. 4 through 6, each of the disk-shaped wick members 46 is united with the adjacent surfaces of the wick 44, by suitable means, including tack welds and the like, not designated. While the disk-shaped wick members 46 can be formed of a porous metal and the like, a laminated construction including a corrugated base plate 50, having radial channels 52, sandwiched between a pair of disk-shaped screens 54, of multiple layers, functions quite satisfactorily for this purpose.

The base plate 50 is formed from suitable sheet metal stock, preferably thin-gauge stock, including alloys having a high-nickel content. The screens 54 preferably are formed from 120 mesh nickel screen stock and are spot-welded to the adjacent surfaces of the plate 50. While not manditory, it is preferred that the screens 54 and plate be sandwiched between a pair of congruent cover plates 56, also formed from relatively thin-gauge stock which serves to impart rigidity to the screen. A plurality of dimples 58 also is provided in each of the cover plates 56 for assisting in the support of the screens 54.

For reasons which are readily apparent, heat is not uniformly generated in the working chamber 42 during periods of operation for the associated motor. As a result, different quantities of vapor tend to flow through space defined by adjacent wick members 46. In order to assure that a uniform vapor pressure is maintained throughout the working chamber 42, each of the wick members 46 is provided with a pair of diametrically opposed openings 60 through which communication between all portions of the chamber 42 is established. Where desired, an eyelet 62 can be spot-welded in each of the openings 60 to serve as a facing therefor.

Each of the disk-shaped wick members 46 also is provided with a plurality of suitable openings, not designated, through which there is extended a plurality of rods 64, FIGS. 3 and 4. These rods serve as register rods for maintaining a desired separation between the wick members 46 as they impart lateral support thereto. Preferably, screw-threaded nuts 66 are provided at opposite sides of each of the wick members 46 for engaging the members in a lateral supporting relationship.

In view of the foregoing, it should readily be apparent that the working chamber 42 includes a network of wicks such that the working fluid F can continuously be delivered along multiple paths to the external surface 11 of the thrust chamber 12, employing capillary forces in a manner consistent with the known principles of heat-pipe cooling.

In order to maintain the temperature of the shell 22 within a given range for thus achieving a condensation of the working fluid F, there is provided in circumscribing relationship with the shell 22 an annular chamber 74. The chamber 74 also is an hermetically sealed chamber and is established employing a cylindrical shell 76 concentrically related to the shell 22 and radially spaced therefrom.

In practice, the shell 76 is seated and hermetically sealed at its opposite ends in a pair of annular grooves 78 provided in the peripheral portion of the end plates 24 and 26. The chamber 74, in turn, is coupled within a fluid circuit, not shown, through suitable fittings 80 extended through the shell 76. The circuit within which the chamber 74 is coupled is employed as a cooling circuit and includes a source of gas, not shown. From this source, gas is delivered through the chamber 74 for purposes of receiving heat transferred thereto through the shell 22 and for conducting heat thus received away from the external surface of the shell 22. Thus the internal surface of the shell 22, adjacent to the wick 44, and the circumscribing adjacent chamber 74 together function as a condenser for condensing vaporized working fluid F transported to a region of the chamber 42 adjacent to the internal surface of the shell 22.

Since the density of thermal flux at the surface 11 of the thrust chamber 12 is greater than the density of the flux at the internal surface of the shell 22, a reduction in thermal flux density is accomplished as the working fluid F is vaporized over the much larger internal surface of the shell 22. Thus, a thermal flux transformation is accomplished employing the chamber 42.

While the chamber 74, as hereinbefore described, functions quite satisfactorily, more precise control of heat transfer can be achieved by seating within the chamber 74 contiguous bars 82, preferably metallic bars, having predetermined thermal impedance. The bars 82 are employed as thermal conductors and are dimensioned to impose a desired control on the transfer of heat from the shell 22 to the shell 76. The bars 82 thus can be employed in lieu of the aforementioned gas delivered through the fittings 80 for transferring thermal flux from the shell 22 to the shell 76.

In order to remove the total heat generated in the thrust chamber 12, a concentrically related outer shell 84 is provided in a circumscribing relationship with the shell 76 and radially spaced therefrom so that there is defined therebetween an outer chamber 86. This chamber is provided with fluid fittings 88 and 90. Through the fitting 88, there is delivered a standing flow of cooling liquid, such as water, liquid fuel and the like, which removes the total heat delivered thereto through the shell 76. Hence, it is possible to achieve a total and efficient transfer of heat delivered to the system 10 from the thrust chamber 12.

OPERATION

It is believed that in view of the foregoing description, the operation of the system will be readily understood and it will be briefly reviewed at this point.

In operation, a significant quantity of heat is discharged through the exhaust section 18 of the thrust chamber 12. However, a substantial quantity of heat also is transferred through the wall of the thrust chamber 12 to the surface 11. The working fluid F supported in the wick 44 and the disk-shaped wick members 46 is delivered by capillary forces to the surface 11 whereupon heat is transferred thereto for elevating the temperature of the working fluid F.

As the temperature of the working fluid F is elevated, followed by its vaporization, a transfer of heat from the thrust chamber 12 to the working fluid F is effected. The working fluid F, in its vapor phase, then is transported to a cooler region of the chamber 42, adjacent the internal surface shell 22 in a manner consistent with the principles of heat-pipe cooling.

The cooler shell 22, in turn, functions as a condenser, and is maintained at a cooler temperature, below that of the working fluid in its liquid phase, through a circulation of gas through the chamber 74 as it is introduced and discharged through the fittings 80. Hence, a significant quantity of the heat delivered through the shell 22 is transported away from the shell through a circulation of the gas passing through the fittings 80 of the chamber 74.

Additionally, heat not transported from the chamber 74, by the gas, is delivered from the chamber 74 through the shell 76 and delivered to fluid circulating through the chamber 86. Consequently, it can be appreciated that the region of the working chamber 42, adjacent the internal surface of the shell 22 can continuously be maintained at a temperature substantially below that of the vapor phase of the working fluid F.

So long as the temperature of the shell is below the temperature of the working fluid F, in its vapor phase, condensation occurs and heat is given up to the shell 22. As condensation occurs, the resulting particles of condensate are deposited on the wick 44 and on the disk-shaped wick members 46, thus permitting the working fluid F to be "pumped," through capillary forces, and returned along the wick 44 and the disk-shaped wick members 46 to the region of the chamber 42 adjacent to the thrust chamber 12, whereupon vaporization of the fluid again occurs.

In view of the foregoing, it should readily be apparent that the thermal flux transfer system of the instant invention provides a practical solution for cooling thrust chambers of reaction motors.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A thermal flux transfer system for cooling a thrust chamber of a reaction motor comprising:
   A. means defining an hermetically sealed chamber including a cylindrical shell adapted to be concentrically related to a given thrust chamber;
   B. means for maintaining the temperature of the shell substantially below that of said thrust chamber;
   C. a working fluid confined within said sealed chamber having a vapor phase at a temperature substantially below the operating temperature of said thrust chamber and a liquid phase at a temperature substantially above the operating temperature of said shell; and
   D. means defining multiple paths for conducting said fluid radially through said sealed chamber including a plurality of axially spaced, coaxially related wicks concentrically related to said thrust chamber, each of said wicks being characterized by a disk shaped laminated structure including a corrugated base plate having a plurality of radially extended corrugations, and a pair of components fabricated from metallic mesh sandwiching said base plate therebetween, whereby said working fluid is conducted as a vapor between said wicks from a region of vaporization located adjacent to said thrust chamber to a region of condensation located adjacent to said shell, and returned as a liquid to said region of vaporization through said plurality of wick members.

2. The system of claim 1 wherein said working fluid is selected from a class of working fluids including sodium, lithium and silver.

3. The system of claim 1 wherein said means defining an hermetically sealed chamber further includes a transverse end plate having a plurality of concentrically related corrugations for accommodating temperature-induced stress as it is developed within said system.

4. The system of claim 1 further comprising thermal flux transfer means coupled with said shell for conducting heat away from the shell including means defining a cylindrical chamber concentrically related to said sealed chamber, and a fluid circuit for conveying a standing flow of gas through said cylindrical chamber along a path having a segment circumscribing a portion of said shell.

5. The system of claim 1 further comprising thermal flux transfer means coupled with said shell for conducting heat away from said shell including means defining a cylindrical chamber concentrically related to said sealed chamber and a plurality of contiguous bars of a solid mass disposed within said cylindrical chamber.

6. The system of claim 4 wherein said thermal flux transfer means further includes means for circulating a cooling liquid about the periphery of said cylindrical chamber.

7. The system of claim 5 wherein said thermal flux transfer means further includes means for circulating a cooling liquid about the periphery of said cylindrical chamber.

* * * * *